US009355453B2

(12) United States Patent
Watanabe et al.

(10) Patent No.: US 9,355,453 B2
(45) Date of Patent: May 31, 2016

(54) THREE-DIMENSIONAL MEASUREMENT APPARATUS, MODEL GENERATION APPARATUS, PROCESSING METHOD THEREOF, AND NON-TRANSITORY COMPUTER-READABLE STORAGE MEDIUM

(75) Inventors: Daisuke Watanabe, Yokohama (JP); Masakazu Fujiki, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/517,293

(22) PCT Filed: Feb. 23, 2011

(86) PCT No.: PCT/JP2011/054678
§ 371 (c)(1),
(2), (4) Date: Jun. 20, 2012

(87) PCT Pub. No.: WO2011/105616
PCT Pub. Date: Sep. 1, 2011

(65) Prior Publication Data
US 2012/0262455 A1     Oct. 18, 2012

(30) Foreign Application Priority Data

Feb. 26, 2010  (JP) ................................ 2010-043060

(51) Int. Cl.
*G06T 17/00*     (2006.01)
*G06T 7/00*     (2006.01)

(52) U.S. Cl.
CPC .................................. *G06T 7/0046* (2013.01)

(58) Field of Classification Search
None
See application file for complete search history.

(56) References Cited

U.S. PATENT DOCUMENTS 6,993,450 B2   1/2006   Takemoto et al.
7,092,109 B2   8/2006   Satoh et al.
(Continued)

FOREIGN PATENT DOCUMENTS

JP   4-086957 A       3/1992
JP   2000-003447 A    1/2000
(Continued)

OTHER PUBLICATIONS

Z. Zhang, "A Flexible New Technique for Camera Calibration," IEEE Transactions on Pattern Analysis and Machine Intelligence, vol. 22, No. 11, pp. 1330-1334, Nov. 2000.
(Continued)

*Primary Examiner* — Ming Hon
*Assistant Examiner* — Khoa Vu
(74) *Attorney, Agent, or Firm* — Fitzpatrick, Cella, Harper & Scinto

(57) ABSTRACT

A three-dimensional measurement apparatus generates a plurality of view-point images obtained by observing a measurement object from a plurality of different view-points using a three-dimensional geometric model, detects edges of the measurement object from the plurality of view-point images as second edges, calculates respective reliabilities of first edges of the three-dimensional geometric model based on a result obtained when the second edges are associated with the first edges, weights each of the first edges based on the respective reliabilities, associates third edges detected from a captured image with the weighted first edges, and calculates a position and an orientation of the measurement object based on the association result.

24 Claims, 14 Drawing Sheets

(56) References Cited

U.S. PATENT DOCUMENTS

| | | |
|---|---|---|
| 7,664,341 B2 | 2/2010 | Takemoto et al. |
| 7,698,094 B2 | 4/2010 | Aratani et al. |
| 7,848,903 B2 | 12/2010 | Aratani et al. |
| 7,860,345 B2 | 12/2010 | Satoh et al. |
| 8,223,146 B2 | 7/2012 | Kotake et al. |
| 2008/0109184 A1* | 5/2008 | Aratani et al. ............... 702/153 |
| 2008/0172201 A1* | 7/2008 | Kotake et al. ............... 702/150 |
| 2008/0267531 A1* | 10/2008 | Satoh et al. .................. 382/289 |
| 2008/0292180 A1* | 11/2008 | Kobayashi et al. ........... 382/154 |
| 2009/0022365 A1* | 1/2009 | Kotake ................... G06K 9/32 382/103 |
| 2010/0142826 A1 | 6/2010 | Kotake et al. |
| 2010/0289797 A1 | 11/2010 | Tateno et al. |
| 2010/0295924 A1 | 11/2010 | Miyatani et al. |
| 2011/0211066 A1 | 9/2011 | Fujiki |
| 2012/0033071 A1 | 2/2012 | Kobayashi et al. |

FOREIGN PATENT DOCUMENTS

| | | |
|---|---|---|
| JP | 2007-020751 A | 2/2007 |
| JP | 2008-116373 A | 5/2008 |
| JP | 2008-309631 A | 12/2008 |

OTHER PUBLICATIONS

D. Lowe, "Fitting Parameterized Three-Dimensional Models to Images," IEEE Transactions on Pattern Analysis and Machine Intelligence, vol. 13, No. 5, pp. 441-450, 1991.

T. Drummond et al., "Real-Time Visual Tracking of Complex Structures," IEEE Transactions on Pattern Analysis and Machine Intelligence, vol. 24, No. 7, pp. 932-946, 2002.

L. Vacchetti et al., "Combining Edge and Texture Information for Real-Time Accurate 3D Camera Tracking," ISMAR '04 Proceedings of the 3rd IEEE/ACM International Symposium on Mixed and Augmented Reality, pp. 48-57, 2004.

V. Lepetit et al., "Keypoint Recognition Using Randomized Trees," IEEE Transactions on Pattern Analysis and Machine Intelligence, vol. 28, No. 9, 2006.

International Search Report in PCT/JP2011/054678 mailed Jun. 7, 2011.

* cited by examiner

FIG. 2A
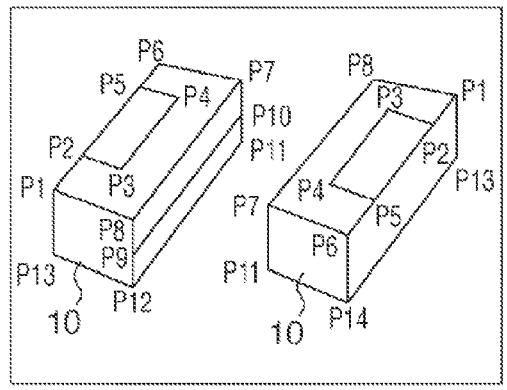
FIG. 2B
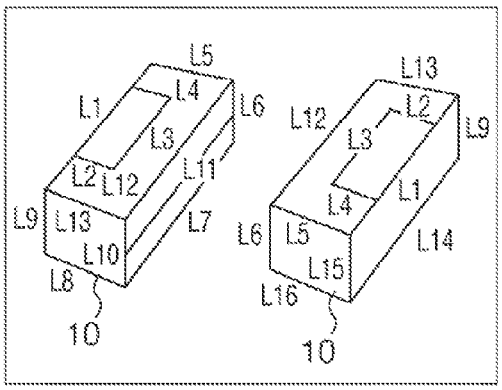
FIG. 2C
| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |
FIG. 2D
| LINE | TWO POINTS AT TWO ENDS |
|---|---|
| L1 | P1-P6 |
| L2 | P2-P3 |
| L3 | P3-P4 |
| L4 | P4-P5 |
| L5 | P6-P7 |
| L6 | P7-P11 |
| L7 | P11-P12 |
| L8 | P12-P13 |
| L9 | P1-P13 |
| L10 | P8-P12 |
| L11 | P9-P10 |
| L12 | P7-P8 |
| L13 | P1-P8 |
| L14 | P13-P14 |
| L15 | P6-P14 |
| L16 | P11-P14 |

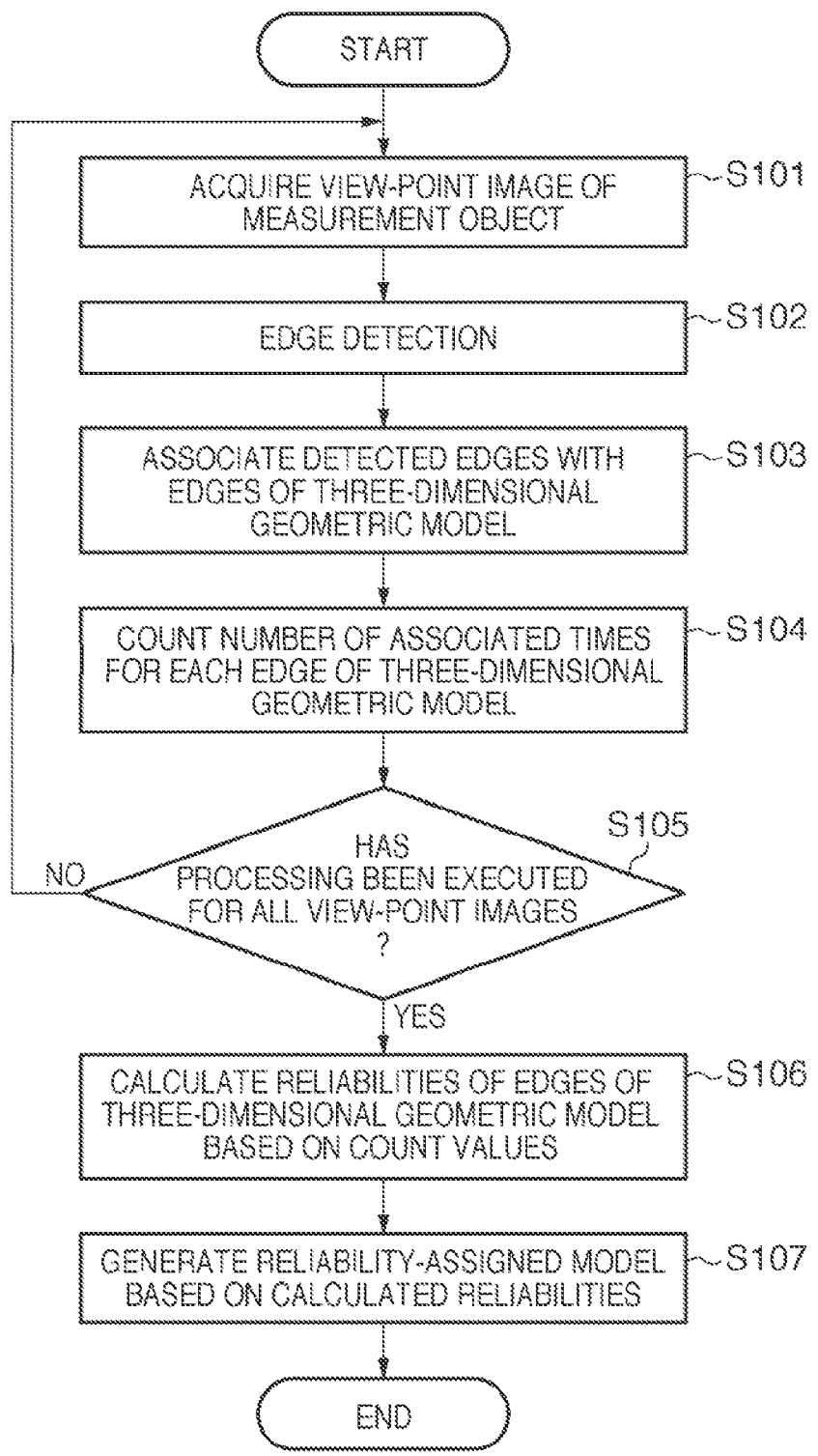

FIG. 5

| CONTROL POINT NUMBER | CONTROL POINT p(x, y, z) | DIRECTION v(a, b, c) | EDGE COUNTER |
|---|---|---|---|
| 0 | 200, 25, 0 | 0.54, −0.44, 0.70 | 0 |
| 1 | 200, 50, 0 | 0.31, 0.77, 0.54 | 1 |
| ⋮ | ⋮ | ⋮ | ⋮ |
| 129 | 50, 125, 75 | 0.44, −0.43, 0.70 | 1 |
| 130 | 50, 150, 75 | 0.49, −0.54, 0.75 | 0 |

FIG. 6

| CONTROL POINT NUMBER | CONTROL POINT p(x, y, z) | DIRECTION v(a, b, c) | RELIABILITY r |
|---|---|---|---|
| 0 | 200, 25, 0 | 0.54, −0.44, 0.70 | 0.55 |
| 1 | 200, 50, 0 | 0.31, 0.77, 0.54 | 0.82 |
| ⋮ | ⋮ | ⋮ | ⋮ |
| 129 | 50, 125, 75 | 0.44, −0.43, 0.70 | 0.43 |
| 130 | 50, 150, 75 | 0.49, −0.54, 0.75 | 0.61 |

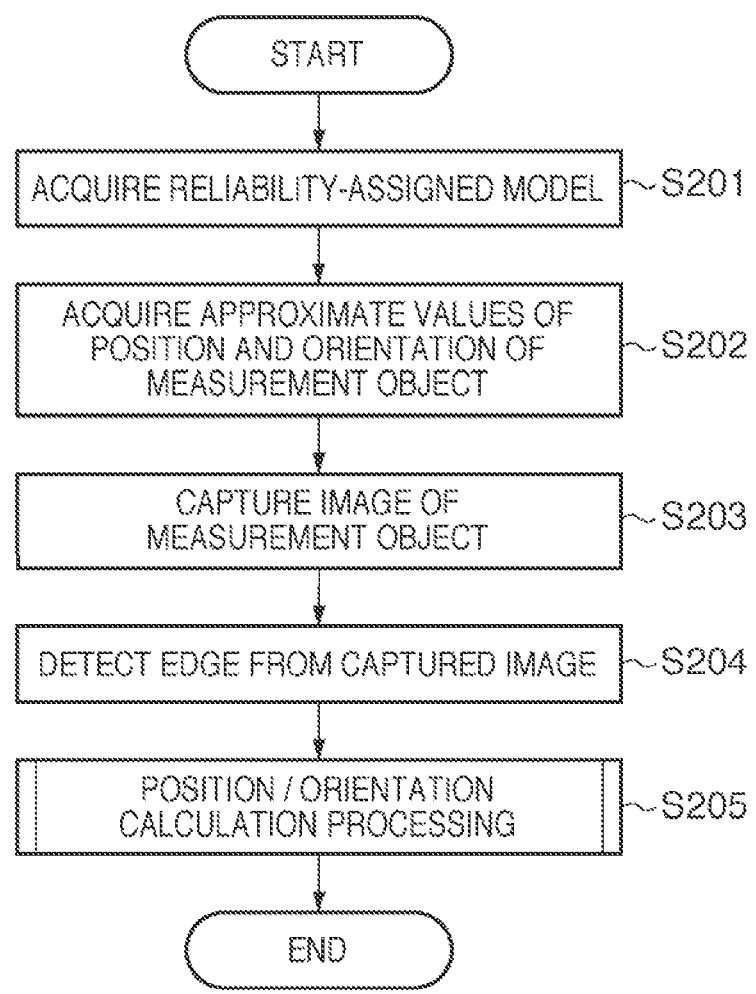

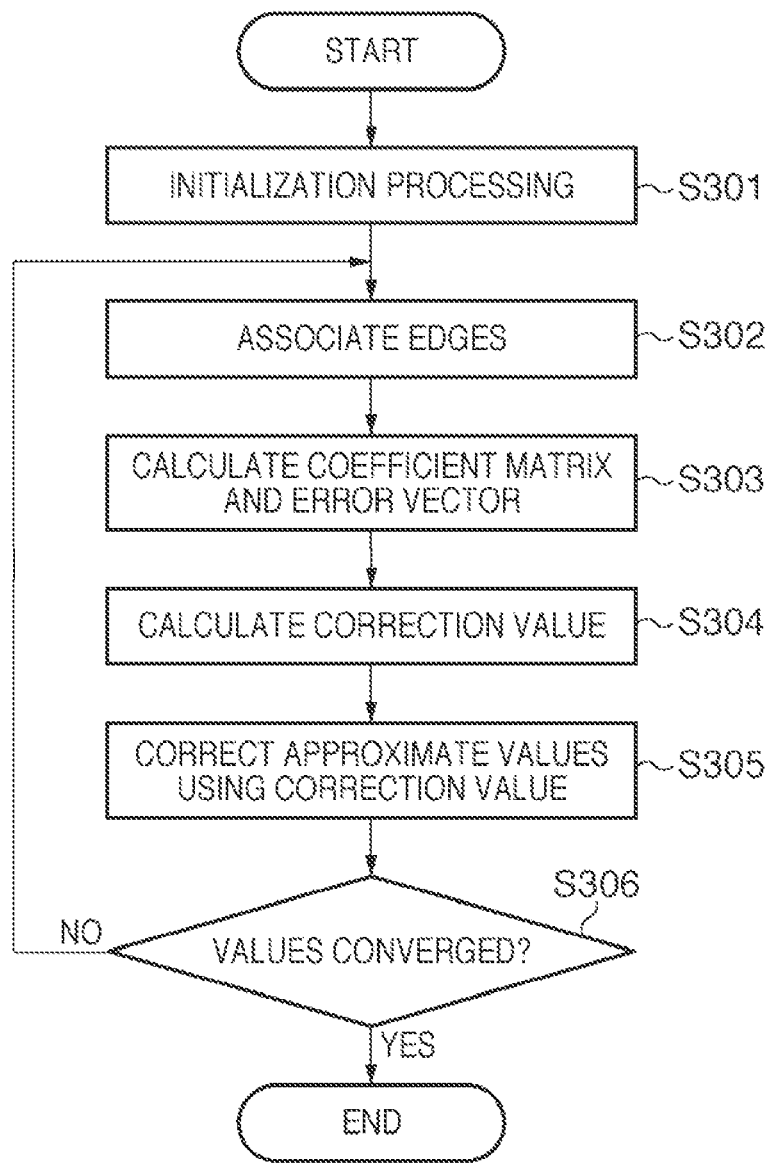

F I G. 12

| CONTROL POINT NUMBER | CONTROL POINT p(x, y, z) | DIRECTION v(a, b, c) | SUM TOTAL OF VIEW-POINT-DEPENDENT RELIABILITIES | EDGE COUNTER |
|---|---|---|---|---|
| 0 | 200, 25, 0 | 0.54, −0.44, 0.70 | 15.44 | 21 |
| 1 | 200, 50, 0 | 0.31, 0.77, 0.54 | 2.92 | 6 |
| ... | ... | ... | ... | ... |
| 129 | 50, 125, 75 | 0.44, −0.43, 0.70 | 8.12 | 19 |
| 130 | 50, 150, 75 | 0.49, −0.54, 0.75 | 7.68 | 19 |

FIG. 14

| CONTROL POINT NUMBER | CONTROL POINT (x, y, z) | DIRECTION (a, b, c) | RELIABILITY OF VIEW-POINT 0 | RELIABILITY OF VIEW-POINT 1 | ... | RELIABILITY OF VIEW-POINT 60 |
|---|---|---|---|---|---|---|
| 0 | 200, 25, 0 | 0.54, −0.44, 0.70 | 0.45 | 0.23 | ... | 0.91 |
| 1 | 200, 50, 0 | 0.31, 0.77, 0.54 | 0 | 0.57 | ... | 0.72 |
| 2 | 200, 75, 0 | 0.33, 0.67, 0.55 | 0.43 | 0.23 | ... | 0.35 |
| ... | ... | ... | ... | ... | ... | ... |
| 128 | 50, 100, 75 | 0.41, −0.43, 0.69 | 0.51 | 0 | ... | 0.77 |
| 129 | 50, 125, 75 | 0.44, −0.43, 0.70 | 0.23 | 0.75 | ... | 0.88 |
| 130 | 50, 150, 75 | 0.49, −0.54, 0.75 | 0.78 | 0.44 | ... | 0.55 |

FIG. 15

| DETECTION NUMBER | CONTROL POINT p(x, y, z) | DIRECTION v(a, b, c) | RELIABILITY r |
|---|---|---|---|
| 0 | 200, 25, 0 | 0.54, −0.44, 0.70 | 0.55 |
| 1 | 200, 50, 0 | 0.31, 0.77, 0.54 | 0.82 |
| ⋮ | ⋮ | ⋮ | ⋮ |
| 116 | 50, 100, 50 | 0.44, −0.43, 0.70 | 0.43 |
| 117 | 50, 125, 50 | 0.49, −0.54, 0.75 | 0.61 |

THREE-DIMENSIONAL MEASUREMENT APPARATUS, MODEL GENERATION APPARATUS, PROCESSING METHOD THEREOF, AND NON-TRANSITORY COMPUTER-READABLE STORAGE MEDIUM

TECHNICAL FIELD

The present invention relates to a three-dimensional measurement apparatus, a model generation apparatus, processing method thereof, and non-transitory computer-readable storage medium.

BACKGROUND ART

In recent years, robots perform complicated tasks, which were manually performed so far. As a representative example of such complicated tasks, assembling processes of industrial products are known. Such robot grips parts by an end effecter such as a hand, so as to autonomously perform assembling processes. In order to control the robot to grip a part, a relative position and orientation between the part to be gripped and the robot are measured. Then, a moving plan has to be designed based on the measurement result so as to control actuators.

In mixed reality, that is, a so-called MR technique as well, in order to seamlessly merge real and virtual worlds in real time, the position and orientation have to be measured. The position and orientation are conventionally measured using a camera and distance sensor. As a representative method of such measurement, methods using a two-dimensional image and range image are known. In the field of the MR technique, a technique for measuring the position and orientation of a head mounted display (to be abbreviated as HMD hereinafter) using an image captured by a camera mounted on the HMD has been studied.

D. G. Lowe, "Fitting parameterized three-dimensional models to images," IEEE Transactions on Pattern Analysis and Machine Intelligence, vol. 13, no. 5, pp. 441-450, 1991. (to be referred to as reference 1 hereinafter) discloses a technique for measuring the position and orientation of an object by performing model fitting to a two-dimensional image without requiring sufficient texture information. With this technique, a three-dimensional geometric model of an object is fitted to line segments (edges) detected from a two-dimensional image. Thus, the position and orientation of the object are measured. More specifically, after edge detection is performed from the entire two-dimensional image, the two-dimensional image is separated into line segments using local connection information. The position and orientation of the object are measured using a Gauss-Newton method so as to minimize a sum total of distances on the image between the end points on both sides of the detected line segments and the line segments of the three-dimensional geometric model based on approximate values of the position and orientation of the object.

Also, T. Drummond and R. Cipolla, "Real-time visual tracking of complex structures," IEEE Transactions on Pattern Analysis and Machine Intelligence, vol. 24, no. 7, pp. 932-946, 2002. (to be referred to as reference 2 hereinafter) discloses a technique for conducting an edge search only in the vicinity of line segments of a three-dimensional geometric model based on approximate values of the position and orientation of an object. With this technique, since edges are not detected from an entire two-dimensional image, the position and orientation of the object can be quickly measured.

Also, reference 2 also describes a technique for calculating reliabilities of respective edges detected from a two-dimensional image according to color contrasts and distances from other edges, and weighting the edges based on the calculated reliabilities. Then, contribution ratios of the respective edges in position/orientation calculation processing are changed.

Furthermore, Japanese Patent Laid-Open No. 2007-20751 (to be referred to as reference 3 hereinafter) discloses a technique for generating a three-dimensional geometric model by leaving only edges which are observed to have higher probabilities in association with generation of a three-dimensional geometric model used in model fitting. With this technique, a plurality of images are generated by observing a three-dimensional geometric model of an object from different view-points, and only edges which are commonly observed from the plurality of view-point images are left. Then, a model with a high edge observability is generated.

The technique of reference 1 is premised on that edges are correctly detected from an image, and the correspondence between the edges detected from the image and those of a three-dimensional geometric model is correct. For this reason, the position and orientation of an object can be measured with high precision as long as edges that obviously indicate texture and shape changes of a target object are always stably detected.

However, when an imaging view-point is moved at the time of imaging of an object, it is difficult to stably detect edges from a captured image. Since appearances of colors of the object in the image change depending on the imaging view-point, edges detected in the image normally change accordingly. In such case, the correspondence between the edges detected from the image and those of a three-dimensional geometric model readily causes errors, and the position/orientation calculation processing precision in the technique of reference 1 drops.

Also, with the technique of reference 2, since edge reliabilities are calculated in real time, the processing load on the position/orientation calculation processing is heavy. Since edges are also detected from a background region other than a measurement object in an image, there is a risk of matching of wrong edges.

Furthermore, with the technique of reference 3, as described above, a model having only edges with high observabilities is generated by leaving edges observed from a plurality of view-point images. This technique is premised on that edges with high observabilities are uniformly and sufficiently distributed on the entire three-dimensional geometric model.

However, in practice, the edge observabilities largely vary for respective view-points. For this reason, when only edges with high observabilities at a plurality of view-points are to be left, only an insufficient number of edges may be obtained. Even when a large number of edges with high observabilities are left, these edges may be biased to a portion of a model. In such case, the position/orientation calculation processing precision drops due to insufficiency or bias of edges.

SUMMARY OF INVENTION

The present invention provides a technique which changes degrees of contribution of respective edges with respect to position/orientation calculation processing using a model in which reliabilities are assigned to respective edges upon measurement of the position and orientation of an object.

According to a first aspect of the present invention there is provided a three-dimensional measurement apparatus, which measures a position and an orientation of a measurement object using a three-dimensional geometric model that defines a shape of the measurement object using a plurality of first edges, the apparatus characterized by comprising: view-point image generation means for generating a plurality of view-point images obtained by observing the measurement object from a plurality of different view-points using the three-dimensional geometric model; edge detection means for detecting edges of the measurement object from the plurality of view-point images as second edges; reliability calculation means for associating the second edges with the first edges, respectively, and calculating respective reliabilities of the first edges based on the association result; weighting means for weighting each of the first edges based on the respective reliabilities of the first edges calculated by the reliability calculation means; and position/orientation calculation means for associating third edges detected from a captured image obtained by capturing an image of the measurement object with the first edges weighted by the weighting means, and calculating a position and an orientation of the measurement object based on the association result.

According to a second aspect of the present invention there is provided a model generation apparatus, which generates a three-dimensional geometric model used for measuring a position and an orientation of a measurement object, the apparatus characterized by comprising: view-point image generation means for generating a plurality of view-point images obtained by observing the measurement object from a plurality of different view-points using the three-dimensional geometric model; edge detection means for detecting edges of the measurement object from the plurality of view-point images; reliability calculation means for associating the detected edges of the measurement object with edges of the three-dimensional geometric model, and calculating reliabilities of the edges of the three-dimensional geometric model based on the association result; generation means for generating a reliability-assigned model by assigning the reliabilities of the edges to the edges of the three-dimensional geometric model.

According to a third aspect of the present invention there is provided a three-dimensional measurement apparatus, which measures a position and an orientation of a measurement object, the apparatus characterized by comprising: holding means for holding a reliability-assigned model obtained by defining a shape of the measurement object using a plurality of edges, and assigning reliabilities to the edges, respectively; edge detection means for detecting edges from a captured image obtained by capturing an image of the measurement object; weighting means for weighting the edges of the reliability-assigned model based on the reliabilities assigned to the edges; and position/orientation calculation means for associating the edges weighted by the weighting means with the edges of the reliability-assigned model held in the holding means, and calculating a position and an orientation of the measurement object based on the association result.

According to a fourth aspect of the present invention there is provided a processing method of a three-dimensional measurement apparatus, which measures a position and an orientation of a measurement object using a three-dimensional geometric model that defines a shape of the measurement object using a plurality of first edges, the method characterized by comprising: a step of generating a plurality of view-point images obtained by observing the measurement object from a plurality of different view-points using the three-dimensional geometric model; a step of detecting edges of the measurement object from the plurality of view-point images as second edges; a step of associating the second edges with the first edges, respectively, and calculating respective reliabilities of the first edges based on the association result; a step of weighting the each of first edges based on the respective reliabilities of the first edges; and a step of associating third edges detected from a captured image obtained by capturing an image of the measurement object with the weighted first edges, and calculating a position and an orientation of the measurement object based on the association result.

According to a fifth aspect of the present invention there is provided a non-transitory computer-readable storage medium storing a computer program for controlling a computer incorporated in a three-dimensional measurement apparatus, which measures a position and an orientation of a measurement object using a three-dimensional geometric model that defines a shape of the measurement object using a plurality of first edges, to function as: view-point image generation means for generating a plurality of view-point images obtained by observing the measurement object from a plurality of different view-points using the three-dimensional geometric model; edge detection means for detecting edges of the measurement object from the plurality of view-point images as second edges; reliability calculation means for associating the second edges with the first edges, respectively, and calculating respective reliabilities of the first edges based on the association result; weighting means for weighting each of the first edges based on the respective reliabilities of the first edges; and position/orientation calculation means for associating third edges detected from a captured image obtained by capturing an image of the measurement object with the first edges weighted by the weighting means, and calculating a position and an orientation of the measurement object based on the association result.

Further features of the present invention will be apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIGS. 2A to 2D are views showing an example of definition information of a three-dimensional geometric model;

FIG. 3 is a flowchart showing an example of the sequence of processing in a three-dimensional measurement apparatus 100 shown in FIG. 1;

FIG. 5 is a table showing an example of edge list data;

FIG. 6 is a table showing an example of definition information of a reliability-assigned model;

FIG. 7 is a flowchart showing an example of the sequence of processing in the three-dimensional measurement apparatus 100 shown in FIG. 1;

FIG. 9 is a flowchart showing an example of the sequence of position/orientation calculation processing in step S205 in FIG. 7;

FIG. 12 is a table showing an example of edge list data according to the second embodiment;

FIG. 14 is a table showing an example of definition information of a reliability-assigned model; and FIG. 15 is a table showing an example of edge list data according to the third embodiment.

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
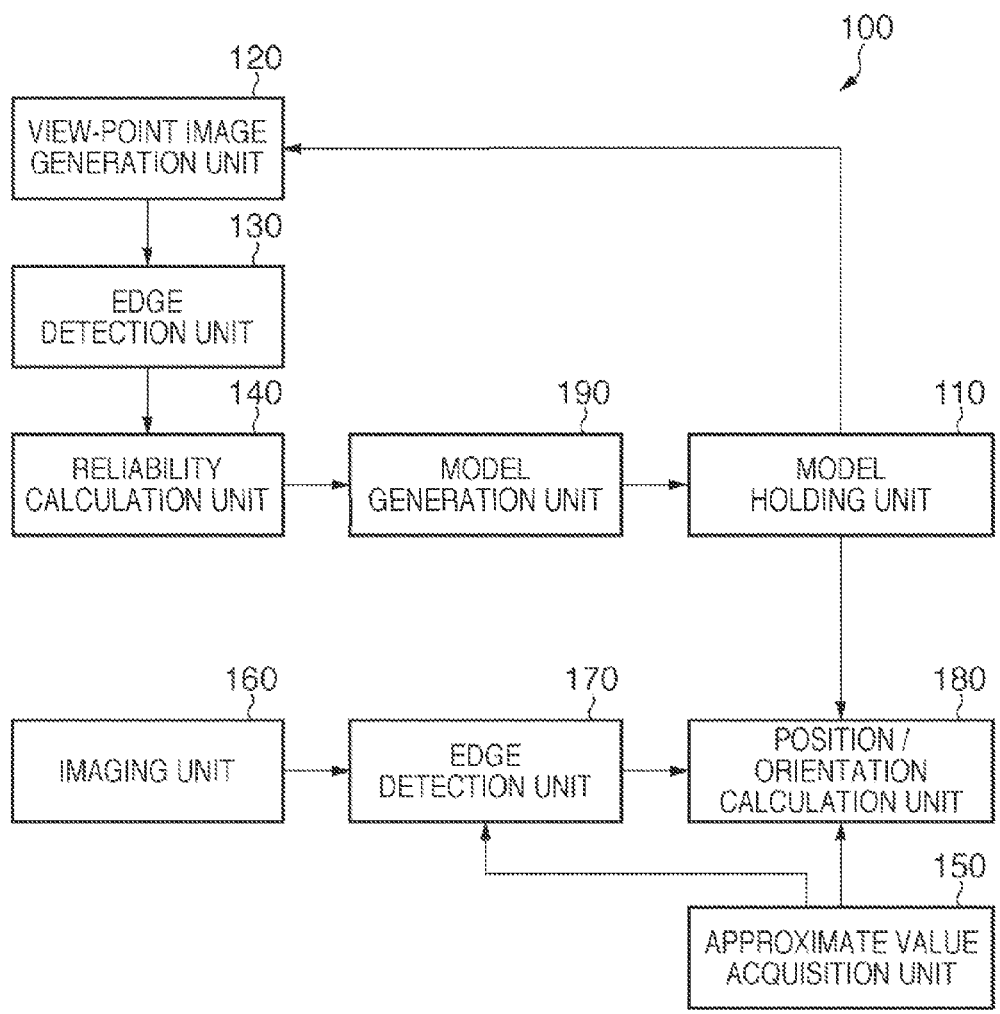
FIG. 1 is a block diagram showing an example of the arrangement of a three-dimensional measurement apparatus according to an embodiment of the present invention.

FIG. 1 is a block diagram showing an example of the arrangement of a three-dimensional measurement apparatus according to an embodiment of the present invention.

A three-dimensional measurement apparatus 100 includes, as its functional arrangement, a model holding unit 110, view-point image generation unit 120, edge detection unit 130, reliability calculation unit 140, and model generation unit 190. Furthermore, the three-dimensional measurement apparatus 100 includes, as its functional arrangement, an approximate value acquisition unit 150, imaging unit 160, edge detection unit 170, and position/orientation calculation unit 180.

The model holding unit 110 holds a three-dimensional geometric model of an object as a measurement target (to be also referred to as a measurement object or simply as an object hereinafter). The three-dimensional geometric model defines a shape of the measurement object using, for example, a plurality of edges (first edges).

More specifically, the three-dimensional geometric model is defined by a set of points and a set of line segments configured by coupling points. A three-dimensional geometric model 10 of the measurement object is configured by 14 points, that is, points P1 to P14, as shown in FIG. 2A. The points P1 to P14 are expressed by three-dimensional coordinate values, as shown in FIG. 2C. Also, the three-dimensional geometric model 10 of the measurement object is configured by line segments L1 to L16, as shown in FIG. 2B. The line segments L1 to L16 are expressed by IDs (identifiers) of the points which configure these line segments, as shown in FIG. 2D. Note that the three-dimensional geometric model also holds information of planes although not shown. Each plane is expressed by IDs of vertices which configure that plane. Note that a case will be described below wherein the three-dimensional geometric model according to this embodiment defines a shape of the measurement object using a plurality of line segments (edges).

The view-point image generation unit 120 generates a plurality of view-point images obtained by observing the measurement object from different view-points. The view-point image generation unit 120 generates the plurality of view-point images using the three-dimensional geometric model held in the model holding unit 110.

The edge detection unit 130 detects edges (second edges) of the measurement object from each of the plurality of view-point images generated by the view-point image generation unit 120.

The reliability calculation unit 140 calculates reliability of respective line segments (edges) of the three-dimensional geometric model based on the edges detected from the respective view-point images, which are detected by the edge detection unit 130. More specifically, the edges (second edges) detected from the plurality of view-point images are respectively associated with the edges (first edges) of the three-dimensional geometric model, and reliabilities of the respective edges in the three-dimensional geometric model are calculated based on the association result.

The model generation unit 190 assigns the reliabilities calculated by the reliability calculation unit 140 to the respective edges of the three-dimensional geometric model held in the model holding unit 110. Thus, a three-dimensional geometric model assigned with the reliabilities (to be also referred to as a reliability-assigned model hereinafter) is generated.

The approximate value acquisition unit 150 inputs approximate information (to be referred to as approximate values hereinafter) of the position and orientation of the object with respect to the three-dimensional measurement apparatus 100. In this embodiment, the position and orientation of the object with respect to the three-dimensional measurement apparatus 100 are those of the object with reference to the imaging unit 160. However, the imaging unit 160 need not always be used as a reference. For example, when the relative position and orientation of the object with respect to a coordinate system of the imaging unit 160 are given, and these position and orientation remain unchanged, another portion in the three-dimensional measurement apparatus 100 may be used as a reference. In this embodiment, as the approximate values of the position and orientation of the object, measurement values which were measured by the three-dimensional measurement apparatus 100 previously (for example, at an immediately preceding timing) are used. However, the approximate values of the position and orientation of the object need not always assume such values. For example, time-series filtering processing (for example, a linear filter or Kalman filter) is applied to the previously measured measurement values of the position and orientation of the object to estimate the motion velocity and angular velocity of the object. Then, values obtained by predicting the position and orientation of the object based on the estimation results may be used as the approximate values. Alternatively, the position and orientation of the object obtained from a sensor may be used as the approximate values. In this case, the sensor need only measure the position and orientation of the object in six degrees of freedom, and its system (for example, a magnetic system, optical system, or ultrasonic system) is not particularly limited. Note that when an approximate position and orientation where the object is placed are determined in advance, these values may be used as the approximate values. The approximate values of the position and orientation of the object are used in calculation processing of the position and orientation of the object.

The imaging unit 160 captures an image of the measurement object. Intrinsic parameter (camera parameters: a focal length, principal point position, and lens distortion parameters) of the imaging unit 160 can be calibrated in advance using a method disclosed in Z. Zhang, "A flexible new technique for camera calibration," IEEE Transactions on Pattern Analysis and Machine Intelligence, vol. 22, no. 11, pp. 1330-1334, 2000.

The edge detection unit 170 detects edges (third edges) as image features from an image (two-dimensional image) of the measurement object captured by the imaging unit 160.

The position/orientation calculation unit 180 measures (calculates) the position and orientation of the measurement object by fitting the edges (first edges) of the reliability-assigned model to the edges (third edges) detected by the edge detection unit 170. The position/orientation calculation unit 180 weights the edges (first edges) of the reliability-assigned model based on the reliabilities assigned to these edges, thereby changing the degrees of contribution of the edges (first edges) to the position/orientation calculation processing.

The example of the arrangement of the three-dimensional measurement apparatus 100 has been described. Note that the aforementioned three-dimensional measurement apparatus 100 incorporates a computer. The computer includes a main control unit such as a CPU, and storage units such as a ROM (Read Only Memory), RAM (Random Access Memory), and HDD (Hard Disk Drive). The computer may also include input/output units such as a keyboard and a display or touch panel, and a communication unit such as a network card. Note that these components are connected via, for example, a bus, and are controlled when the main control unit executes programs stored in the storage units.

An example of the sequence of processing in the three-dimensional measurement apparatus 100 shown in FIG. 1 will be described below with reference to FIG. 3. In this case, the sequence of processing upon generation of the reliability-assigned model will be described.

[S101]

Upon starting this processing, the three-dimensional measurement apparatus 100 controls the view-point image generation unit 120 to generate a plurality of view-point images obtained by observing the measurement object from a plurality of view-points by simulation.

Figure 4:
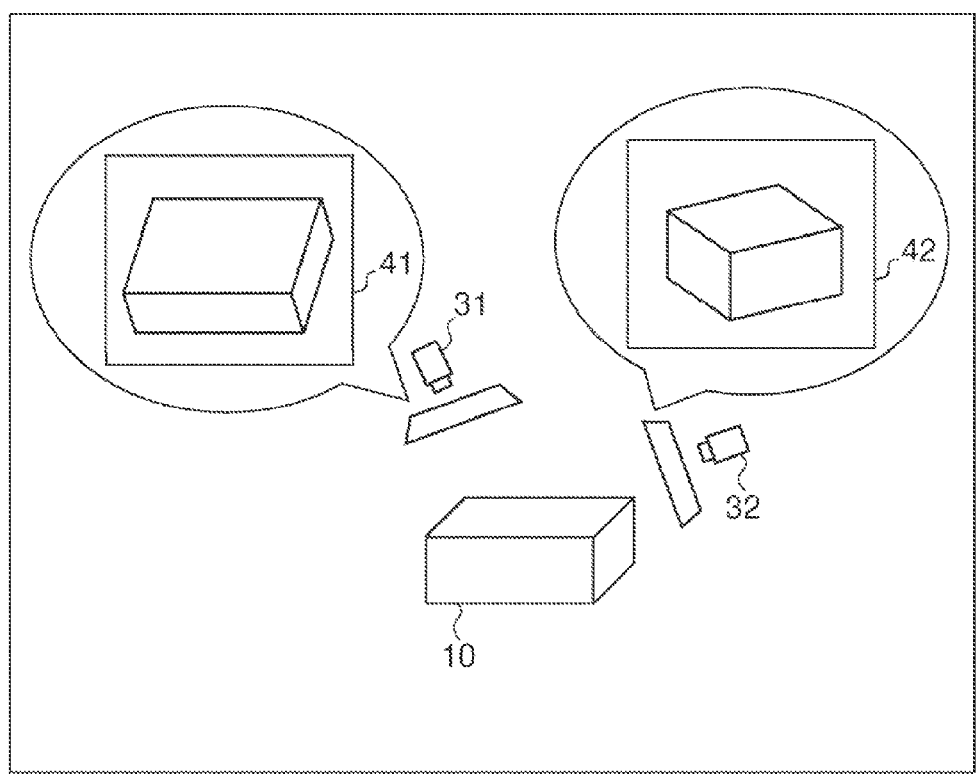
FIG. 4 is a view illustrating generation of a view-point image.

This generation processing of a view-point image will be described below with reference to FIG. 4. The orientation of a virtual camera is selected as indicated by, for example, a camera 31. The virtual camera 31 renders a three-dimensional geometric model 10 observed from the selected position and orientation by CG (Computer Graphics), thereby generating a view-point image 41 of the three-dimensional geometric model 10 from that view-point. Likewise, when the orientation of the virtual camera is selected as indicated by, for example, a camera 32, a view-point image 42 of the three-dimensional geometric model 10 from the view-point of the virtual camera 32 is generated.

Note that when the edges of the reliability-assigned model are weighted according to their reliabilities in the position/orientation calculation processing, the respective view-point images have to be similar to an image captured by the imaging unit 160. Since a light source condition, background environment, and texture of the target object largely influence the edge detection, it is effective to use photo realistic rendering which makes these conditions be similar to each other as much as possible. For example, it is desired to simulate use of the three-dimensional geometric model with texture, light source environment, background environment, and the like under the same conditions as those upon capturing an image by the imaging unit 160.

The position and orientation of the virtual camera are uniformly selected within, for example, a range defined by the user. For example, a Geodesic dome having a predetermined size, which can cover a target object configured by a polyhedron, may be assumed, and view-point images viewed from respective vertices of the polyhedron may be acquired. Note that the selection method of the position and orientation of the virtual camera is not limited to this. For example, in another method, a sphere having a predetermined size, which can cover a target object, may be assumed, latitudes and longitudes like those of a globe may be assigned, and view-points may be set at equal intervals in the latitude and longitude directions.

[S102]

The three-dimensional measurement apparatus 100 controls the edge detection unit 130 to detect edges (line segments) from the respective view-point images. The edge detection can use, for example, a canny or sobel edge filter. The edge detection units 130 and 170 desirably adopt the same edge detection method. Note that in this embodiment, the detected edges are divided on each image at equal intervals to set control points. Then, the edges (to be also referred to as two-dimensional edges hereinafter) are expressed using the coordinates of control points on the image and two-dimensional vectors indicating the edge directions.

[S103 to S105]

The three-dimensional measurement apparatus 100 controls the reliability calculation unit 140 to calculate the correspondence between the two-dimensional edges detected by the process in step S102 and the coordinate system of the three-dimensional geometric model. In this embodiment, triangular patch models each having a predetermined size are generated for the three-dimensional geometric model, and an edge having an angle which is made by normals to two neighboring triangles on the three-dimensional geometric model and is equal to or larger than a predetermined value, is considered as that on the three-dimensional geometric model. Then, an edge is expressed on a three-dimensional space based on three-dimensional coordinates of a middle point of a common line segment in the two neighboring triangles, and a three-dimensional vector which indicates the direction of the line segment. This edge will also be referred to as a three-dimensional edge hereinafter.

The reliability calculation unit 140 assigns control point numbers to the control points of the respective three-dimensional edges. Then, the control point numbers of the three-dimensional edges to which the two-dimensional edges correspond are searched for. In this way, the two-dimensional edges and three-dimensional edges are associated with each other. That is, the edges detected from the view-point images are associated with those of the three-dimensional geometric model.

In this embodiment, the two-dimensional edges are projected onto the three-dimensional space based on depth buffers obtained by rendering the three-dimensional geometric model or the camera parameters. Then, the coordinates and directions of the control points on the three-dimensional space are calculated based on the control points of the two-dimensional edges and their directions. Three-dimensional edges obtained by projecting the two-dimensional edges onto the three-dimensional space will also be referred to as three-dimensional projected edges hereinafter.

At this time, when a distance between the control points and an angle made by normal vectors of the three-dimensional projected edge and three-dimensional edge are small and are equal to or smaller than thresholds, the two-dimensional edge as the generation source of that three-dimensional projected edge is associated with the three-dimensional edge.

In this case, the reliability calculation unit 140 executes the processes in steps S101 to S104 to the respective view-point images, and includes a counting unit that counts the number of times when edges (three-dimensional projected edges) detected from each view-point image are associated with the edges (three-dimensional edges) of the three-dimensional geometric model. This count value is held in edge list data.

The edge list data will be described below with reference to FIG. 5. This list holds information associated with edges (three-dimensional edges) which configure the three-dimensional geometric model.

The edge list data holds information including a control point number used to identify each three-dimensional edge, three-dimensional coordinates of a control point, a three-dimensional vector indicating the direction of that edge, and a count value indicating the number of times when the corresponding three-dimensional edge is observed in different view-point images. An initial value of the count value is, for example, "0", and when a given three-dimensional edge is associated with a three-dimensional projected edge (two-dimensional edge), the count value of that three-dimensional edge is incremented by "1".

In this case, three-dimensional edges having identical control point numbers represent identical edges in other view-point images. For this reason, by associating edges in all view-point images to those of the three-dimensional geometric model, how many times each three-dimensional edge (each edge of the three-dimensional geometric model) is associated at different view-points can be counted.

[S106]

The three-dimensional measurement apparatus 100 controls the reliability calculation unit 140 to calculate reliabilities of the respective three-dimensional edges using the edge list data (data that holds the numbers of observation times (count values) in different view-point images for respective edges) obtained by the process in step S103. Letting $C_{max}$ be a maximum count value in all edges, $C_{min}$ be a minimum count value, and $C_i$ be a count value of an edge having a control point number i, a reliability $r_i$ of that edge can be calculated by:

$$r_i = \frac{C_i - C_{min}}{C_{max} - C_{min}} \qquad (1)$$

The three-dimensional measurement apparatus 100 controls the model generation unit 190 to assign the reliabilities calculated by the process in step S105 to the respective edges of the three-dimensional geometric model held in the model holding unit 110. Then, a reliability-assigned model is generated.

FIG. 6 is a table showing an example of definition information of the reliability-assigned model.

Respective edges, which configure the reliability-assigned model, are identified by the control point numbers. The definition information of each edge includes coordinates of an edge control point, a vector indicating an edge direction, and a reliability which assumes a value ranging from 0 to 1. As described above, in the reliability-assigned model generation processing, the number of observation times of an identical edge from view-point images generated by observing the three-dimensional geometric model from a plurality of different view-points is counted, and a reliability is calculated based on that count value. Thus, the reliability-assigned model to which the reliabilities are assigned is generated.

The sequence of processing upon calculation of the position and orientation of the object will be described below with reference to FIG. 7.

[S201, S202]

The three-dimensional measurement apparatus 100 acquires the reliability-assigned model generated by the process in step S107 in FIG. 3 from the model holding unit 110. Also, the three-dimensional measurement apparatus 100 controls the approximate value acquisition unit 150 to acquire approximate values of the position and orientation of the object with respect to the three-dimensional measurement apparatus 100.

[S203, S204]

Next, the three-dimensional measurement apparatus 100 controls the imaging unit 160 to capture an image of the measurement object, and controls the edge detection unit 170 to detect edges as image features from the captured image.

An example of an overview of an edge detection method according to this embodiment will be described below with reference to FIGS. 8A and 8B. In edge detection, a three-dimensional geometric model is projected onto a captured image (two-dimensional image) of the measurement object based on the approximate values of the position and orientation of the measurement object. Edges (projected images) obtained by projecting those (three-dimensional edges) of the three-dimensional geometric model onto the two-dimensional image will be referred to as two-dimensional projected edges. Control points are set on each two-dimensional projected edge at equal intervals. Note that each two-dimensional projected edge is expressed by control points and its direction.

Figure 8A:
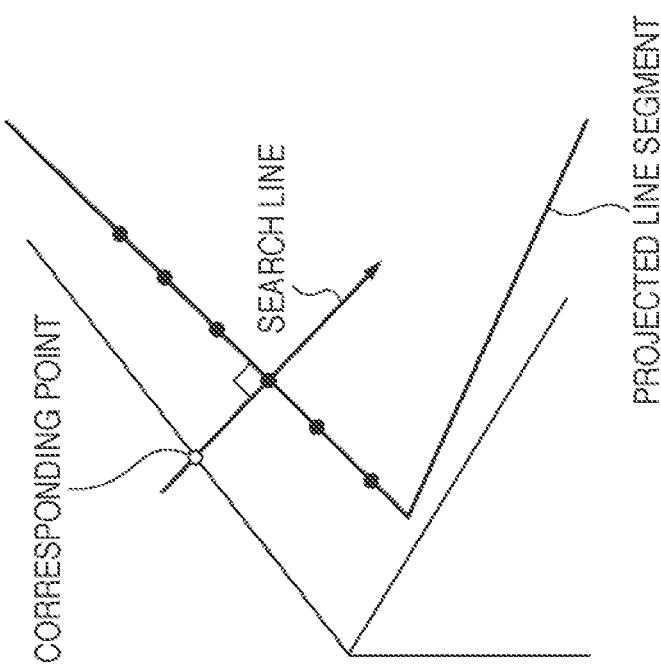
FIGS. 8A and 8B are views showing an example of an overview of an edge detection method.
Figure 8B:
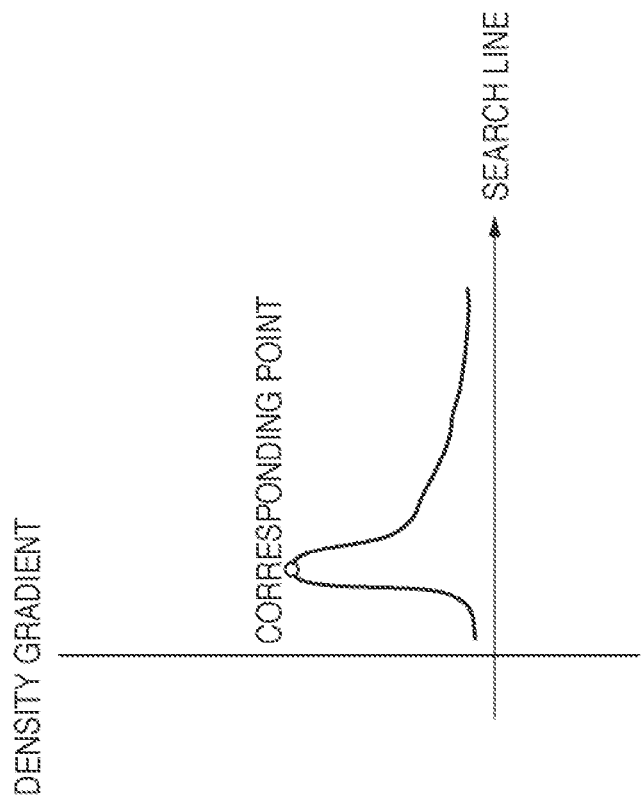

From a line segment which is parallel to a normal direction to the two-dimensional projected edge and passes through the control point (to be referred to as a search line hereinafter), an edge of the measurement object on the captured image (two-dimensional image) is linearly searched for (FIG. 8A). The edge assumes an extreme value of the density gradient of pixel values (FIG. 8B). In some cases, a plurality of edges may be detected from the search line. In this case, this embodiment uses a technique disclosed in L. Vacchetti, V. Lepetit, and P. Fua, "Combining edge and texture information for real-time accurate 3D camera tracking," Proc. ISMAR04, pp. 48-57, 2004. That is, a plurality of edges detected using the method disclosed in this reference are held as hypotheses. In this way, edges corresponding to respective control points on the two-dimensional projected edges are searched for.

[S205]

The three-dimensional measurement apparatus 100 controls the position/orientation calculation unit 180 to calculate (measure) the position and orientation of the measurement object using the edge group detected by the process in step S204. Note that details of this processing will be described later. This processing is executed by changing the degrees of contribution of the respective edges to the position/orientation calculation processing by weighting the respective edges of the three-dimensional geometric model according to the reliabilities of those edges.

An example of the sequence of the position/orientation calculation processing in step S205 in FIG. 7 will be described below with reference to FIG. 9.

In this processing, iterative arithmetic operations are made based on a Gauss-Newton method to correct the approximate values of the position and orientation (which will be expressed by a six-dimensional vector s hereinafter) of the measurement object. Thus, the position and orientation of the measurement object are calculated. Note that the position/orientation calculation processing is not limited to the Gauss-Newton method. For example, a Levenberg-Marquardt method as more robust calculations may be used, or a steepest descent method as a simpler method may be used. Also, other nonlinear optimization calculation methods such as a conjugate gradient method and ICCG method may be used.

In this processing, a sum total of distances between the edges detected from the two-dimensional image and those of the three-dimensional geometric model projected onto the image based on the approximate values of the position and orientation is minimized. Thus, the position and orientation of the measurement object are calculated. More specifically, signed distances of points and lines on the two-dimensional images are respectively expressed as linear functions that indicate infinitesimal changes of the position and orientation of the object using linear Taylor expansions. Then, linear simultaneous equations associated with the infinitesimal changes of the position and orientation, which yield signed distances=0, are developed and solved to calculate the infinitesimal changes of the position and orientation of the object, and the correction processing of these values is repeated.

[S301]

The three-dimensional measurement apparatus 100 controls the position/orientation calculation unit 180 to execute initialization processing. In this initialization processing, for example, the approximate values of the position and orientation of the measurement object obtained by the process in step S202 in FIG. 7 are acquired.

[S302]

The three-dimensional measurement apparatus 100 controls the position/orientation calculation unit 180 to associate edges with each other. More specifically, the three-dimensional geometric model is projected onto the image (two-dimensional image) of the measurement object captured by the process in step S203 in FIG. 7 based on the approximate values of the position and orientation of the measurement object. Thus, the edges of the three-dimensional geometric model are associated with those of the measurement object on the two-dimensional image.

Note that when a plurality of edges of the measurement object (edges on the two-dimensional image) are detected in correspondence with each control point on an edge of the three-dimensional geometric model, the following processing can be executed. That is, an edge on the image closest to the projected edge (two-dimensional projected edge) of the three-dimensional geometric model of the plurality of detected edges can be associated with the control point.

[S303]

The three-dimensional measurement apparatus 100 controls the position/orientation calculation unit 180 to calculate a coefficient matrix and error vectors required to solve the linear simultaneous equations. In this case, respective elements of the coefficient matrix are first-order partial derivative coefficients with respect to the infinitesimal changes of the approximate values, which are acquired by the process in step S301. As for edges, partial derivative coefficients of image coordinates are calculated. Note that the error vectors indicate distances on the image between the two-dimensional projected edges and two-dimensional edges detected from the image.

Figure 10:
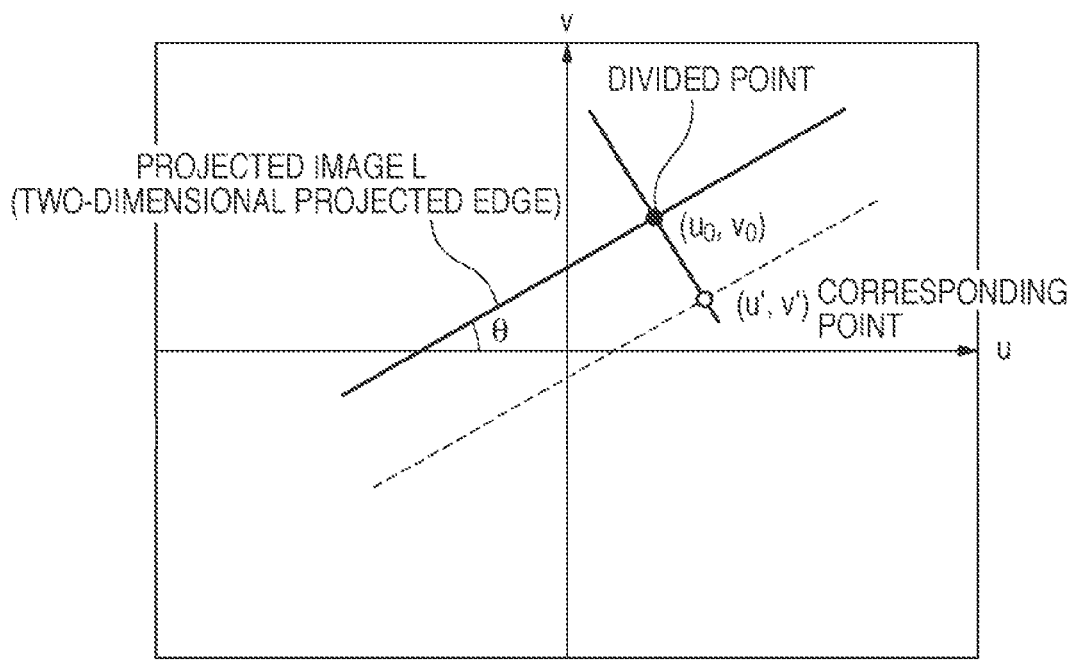
FIG. 10 is a view showing an example of the relationship between a projected image and two-dimensional edge detected from an image.

FIG. 10 shows an example of the relationship between a projected image (two-dimensional projected edge) and a two-dimensional edge detected from the image. In this case, a horizontal direction of the image is defined as a u-axis, and a vertical direction is defined as a v-axis. Let $(u_0, v_0)$ be coordinates of a certain control point (a point obtained by dividing a two-dimensional projected edge at equal intervals on the image) on the image. Also, let θ be an inclination (that with respect to the u-axis) of a line segment (two-dimensional projected edge) L to which that control point belongs on the image. The inclination indicates that of a line specified by projecting three-dimensional coordinates of two ends of the line segment (two-dimensional projected edge) onto the image based on the vector s, and coupling these coordinates of the two ends. A normal vector of the two-dimensional projected edge on the image is expressed by (sin θ, −cos θ). Furthermore, let (u', v') be coordinates of a point (corresponding point) on the image corresponding to the control point. In this case, a point (u, v) on a line (broken line) which passes through the coordinates (u', v') of the corresponding point and has the inclination θ can be expressed by:

$$u \sin\theta - v \cos\theta = d \quad (2)$$

where θ is a constant. Also, d is a constant which is given by:

$$d = u' \sin\theta - v' \cos\theta$$

The position of the control point on the image changes depending on the position and orientation of the measurement object. The position and orientation of the measurement object are defined in six degrees of freedom. That is, s is a six-dimensional vector, which includes three elements that indicate the position of the measurement object, and three elements that express the orientation. The three elements that express the orientation are expressed by, for example, Euler angles or a three-dimensional vector, directions of which represent rotation axes that pass through an origin, and magnitudes of which represent rotation angles. The coordinates (u, v) on the image of a point (control point) which changes depending on the position and orientation of the measurement object can be approximated using a linear Taylor expansion by:

$$u \approx u_0 + \sum_{i=1}^{6} \frac{\partial u}{\partial s_i}\Delta s_i \quad (3)$$

$$v \approx v_0 + \sum_{i=1}^{6} \frac{\partial v}{\partial s_i}\Delta s_i$$

where $\Delta s_i$ (i=1, 2, ..., 6) represents a infinitesimal change of each component of s.

It can be assumed that the position of the control point on the image, which is obtained by correct s, is located on a line expressed by equation (2). Substitution of u and v approximated by expressions (3) into equation (2) yields:

$$\sin\theta\sum_{i=1}^{6}\frac{\partial u}{\partial s_i}\Delta s_i - \cos\theta\sum_{i=1}^{6}\frac{\partial v}{\partial s_i}\Delta s_i = d - r \quad (4)$$

where r is a constant, which is given by:

$$r = u_0 \sin\theta - v_0 \cos\theta$$

Equation (4) holds for all the edges associated in step S302. For this reason, linear simultaneous equations about $\Delta s_i$ hold, as described by:

$$\begin{bmatrix} \sin\theta_1\frac{\partial u_1}{\partial s_1} - \cos\theta_1\frac{\partial v_1}{\partial s_1} & \sin\theta_1\frac{\partial u_1}{\partial s_2} - \cos\theta_1\frac{\partial v_1}{\partial s_2} & \cdots & \sin\theta_1\frac{\partial u_1}{\partial s_6} - \cos\theta_1\frac{\partial v_1}{\partial s_6} \\ \sin\theta_2\frac{\partial u_2}{\partial s_1} - \cos\theta_2\frac{\partial v_2}{\partial s_1} & \sin\theta_2\frac{\partial u_2}{\partial s_2} - \cos\theta_2\frac{\partial v_2}{\partial s_2} & \cdots & \sin\theta_2\frac{\partial u_2}{\partial s_6} - \cos\theta_2\frac{\partial v_2}{\partial s_6} \\ \vdots & \vdots & \ddots & \vdots \\ \sin\theta_n\frac{\partial u_2}{\partial s_1} - \cos\theta_n\frac{\partial v_n}{\partial s_1} & \sin\theta_n\frac{\partial u_n}{\partial s_2} - \cos\theta_n\frac{\partial v_n}{\partial s_2} & \cdots & \sin\theta_n\frac{\partial u_n}{\partial s_6} - \cos\theta_n\frac{\partial v_n}{\partial s_6} \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ d_n - r_n \end{bmatrix} \quad (5)$$

In this case, simultaneous equations (5) are expressed by:

$$J\Delta s = E \quad (6)$$

Partial derivative coefficients are calculated so as to calculate a coefficient matrix J of linear simultaneous equation (6). The partial derivative coefficients can be calculated using, for example, a method disclosed in V. Lepetit and P. Fua, "Keypoint recognition using randomized trees," IEEE Transactions on Pattern Analysis and Machine Intelligence, vol. 28, no. 9, 2006.

[S304]

Subsequently, the three-dimensional measurement apparatus 100 controls the position/orientation calculation unit 180 to calculate a correction value Δs using a generalized inverse matrix $(J^T \cdot J)^{-1} \cdot J^T$ of the matrix J based on equation (6).

In this case, since edges often assume outliers caused by, for example, detection errors, a robust estimation method to be described below is used. In general, in an edge as an outlier, an error [d−r] becomes large. For this reason, such edge has a larger degree of contribution to simultaneous equations (5) and (6), and the precision of the consequently obtained correction value Δs drops. Hence, a smaller weight is given to data having a larger absolute value of the error [d−r], and a larger weight is given to data having a smaller absolute value of the error [d−r]. The weight is given using, for example, a Tukey function, which is described by:

$$w(d-r) = \begin{cases} \left(1 - ((d-r)/c_1)^2\right)^2 & |d-r| \leq c_1 \\ 0 & |d-r| > c_1 \end{cases} \quad (7)$$

where $c_1$ is a constant.

Note that the function used to give the weight is not limited to the Tukey function as long as a function gives a smaller weight to data having a larger absolute value of the error, and a larger weight to data having a smaller absolute value of the error. For this reason, for example, a Huber function may be used. Letting $w_i$ be a weight corresponding to each edge, a weighting matrix $W_1$ is defined, as given by:

$$W_1 = \begin{bmatrix} w_1 & & & 0 \\ & w_2 & & \\ & & \ddots & \\ 0 & & & w_n \end{bmatrix} \quad (8)$$

The weighting matrix $W_1$ is a square matrix in which all components assume "0" except for diagonal components, and the diagonal components assume the weights $W_i$. In this embodiment, in addition to the weighting matrix given by equation (8), the degrees of contribution of edges with higher certainties are increased using the reliabilities calculated by the process in step S106 in FIG. 3. Thus, the precision of the position/orientation calculation processing is improved.

In this case, the three-dimensional measurement apparatus 100 controls the position/orientation calculation unit 180 to acquire the reliabilities corresponding to all the two-dimensional projected edges with reference to the reliability-assigned model shown in FIG. 6. At this time, letting $r_i$ be a reliability of each edge, a weighting matrix $W_2$ is defined, as given by:

$$W_2 = \begin{bmatrix} r_1 & & & 0 \\ & r_2 & & \\ & & \ddots & \\ 0 & & & r_n \end{bmatrix} \quad (9)$$

The weighting matrix $W_2$ is a square matrix in which all components assume "0" except for diagonal components. The diagonal components assume the reliabilities $r_i$ of the respective edges at the selected view-point.

Using the weighting matrices $W_1$ and $W_2$, a weighting matrix $W$ is defined, as given by:

$$W = W_1 \cdot W_2 \quad (10)$$

Using this weighting matrix W, equation (6) is modified like:

$$WJ\Delta s = WE \quad (11)$$

The correction value Δs is calculated by solving equation (11) like:

$$\Delta s = (J^T W J)^{-1} J^T W E \quad (12)$$

The three-dimensional measurement apparatus 100 controls the position/orientation calculation unit 180 to correct the approximate values of the position and orientation obtained by the process in step S301 using the correction value Δs calculated by the process in step S304. In this way, the position and orientation of the measurement object are calculated.

The three-dimensional measurement apparatus 100 controls the position/orientation calculation unit 180 to determine whether or not the measurement values of the position and orientation of the measurement object are converged. If the measurement values are converged, this processing ends; otherwise, the process returns to step S302 again. It is determined that the measurement values are converged when the correction value Δs is nearly zero or when a difference between the square sums of error vectors before and after correction is nearly zero.

As described above, according to the first embodiment, the three-dimensional geometric model assigned with the reliabilities of the respective edges (reliability-assigned model) is generated, and the position/orientation calculation processing is executed using this model. At this time, the position/orientation calculation processing is executed by weighting the edges of the three-dimensional geometric model using the reliabilities associated with those edges, thereby changing the degrees of contribution of the respective edges with respect to the position/orientation calculation processing.

As a result, even when edges detected from a captured image have changed due to a view-point change, three-dimensional information of the measurement object (that is, the position and orientation of the measurement object) can be precisely measured.

Since the reliabilities for the respective edges of the three-dimensional geometric model of the measurement object are calculated, edges of, for example, a background region can be prevented from being mixed compared to a case in which reliabilities are calculated for edges detected from a captured image. For this reason, reliability calculations can be speeded up, and the certainties of the values can also be improved. Furthermore, since the reliability of the edges of the three-dimensional geometric model are calculated in advance using the three-dimensional geometric model, the processing speed of the position/orientation calculation processing can be prevented from being lowered.

Modification-1 of First Embodiment

In the aforementioned first embodiment, the weighting matrix given by equation (9) is defined using the reliabilities of the edges of the three-dimensional geometric model, and the degrees of contribution of the respective edges to the position/orientation calculation processing are changed using this weighting matrix. However, the degrees of contribution may be changed by other methods.

For example, the value of the constant $c_1$ of equation (7) may be changed based on the edge reliabilities. More specifically, $c_1$ is set to be large when the reliability of the corresponding edge is high, and to be small when the reliability is low. In this manner, the degrees of contribution of the respective edges with respect to the position/orientation calculation processing can be changed. Note that in this case, the weighting matrix W defined by equation (10) is defined like:

$$W = W_1 \quad (13)$$

Then, a larger weight can be given to an edge with a higher reliability.

Modification-2 of First Embodiment

The aforementioned first embodiment has explained the case in which a plurality of view-point images are generated using photo realistic rendering. However, the present invention is not limited to this, but other methods may be used as long as they can generate images similar to an image captured by the imaging unit 160. For example, a camera may be attached to the distal end of a robot arm, and images obtained by capturing a target object by moving the camera to desired positions and orientations may be used as a plurality of view-point images. In this case, intrinsic parameters (a focal length, principal point position, and lens distortion parameters) of the camera used in imaging can be calibrated in advance as those of the imaging unit 160 using, for example, the method disclosed in Z. Zhang, "A flexible new technique for camera calibration," IEEE Transactions on Pattern Analysis and Machine Intelligence, vol. 22, no. 11, pp. 1330-1334, 2000.

Second Embodiment

The second embodiment will be described below. The second embodiment will explain a case in which a reliability-assigned model that additionally considers reliabilities of edges detected from respective view-point images is generated.

Note that the functional arrangement of a three-dimensional measurement apparatus 100 according to the second embodiment is the same as that shown in FIG. 1 used to explain the first embodiment, and a detailed description thereof will not be repeated.

As a difference in terms of the arrangement, a reliability calculation unit 140 includes an edge reliability calculation function and reliability sum total calculation function in addition to the aforementioned functions. The edge reliability calculation function is a function of calculating reliabilities of edges (second edges) detected from a plurality of view-point images.

The reliability sum total calculation function is a function of assigning, when edges detected from respective view-point images (three-dimensional projected edges) are associated with edges of a three-dimensional geometric model (three-dimensional edges), reliabilities of the three-dimensional projected edges to the associated three-dimensional edges. The reliability of the three-dimensional projected edge is assigned to the corresponding three-dimensional edge by addition. In this way, the final reliabilities to be assigned to the three-dimensional edges (those for respective first edges) are calculated.

Figure 11:
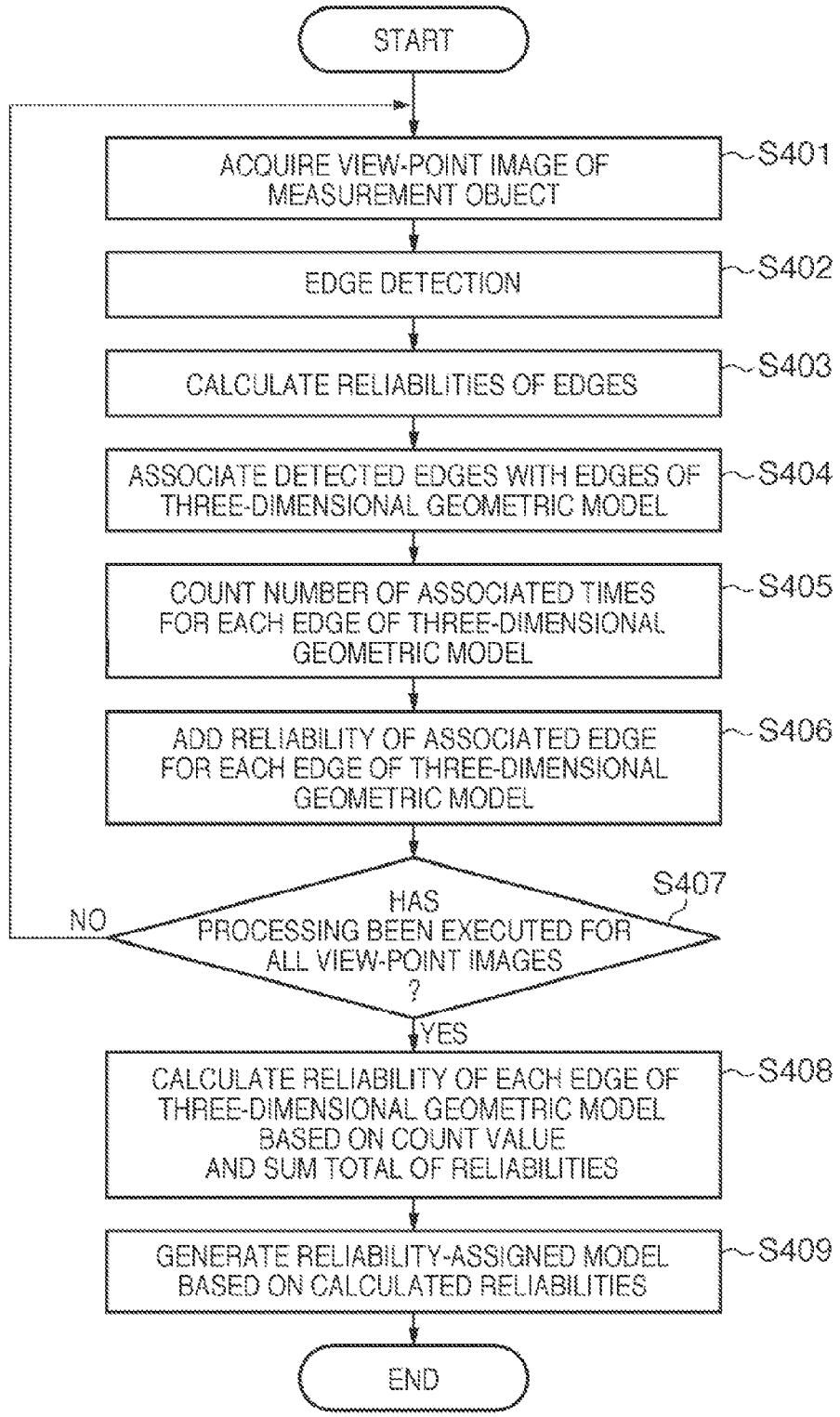
FIG. 11 is a flowchart showing an example of the sequence of processing in a three-dimensional measurement apparatus 100 according to the second embodiment.

Next, processing different from the first embodiment will be described below. The different processing includes reliability-assigned model generation processing (FIG. 3). The sequence of the reliability-assigned model generation processing according to the second embodiment will be described below with reference to FIG. 11.

[S401]

Upon starting this processing, the three-dimensional measurement apparatus 100 controls a view-point image generation unit 120 to generate a plurality of view-point images obtained by observing a measurement object from a plurality of view-points by simulation. Since this process is the same as the first embodiment, a detailed description thereof will not be repeated.

[S402]

The three-dimensional measurement apparatus 100 controls an edge detection unit 130 to detect edges (two-dimensional edges) from the respective view-point images generated by the process in step S401. Then, the reliability calculation unit 140 calculates reliabilities of the detected two-dimensional edges.

Upon calculation of a reliability, a search line is set in a normal direction to an edge for each control point of each two-dimensional edge. In this embodiment, a reliability $r_i$ of a two-dimensional edge is calculated based on a luminance gradient change ratio of the search line. For example, let $grad_{max}$ be a maximum luminance gradient change ratio in the search line direction on all the two-dimensional edges detected from a certain view-point image, and $grad_{min}$ be a minimum change ratio. Also, let grad be a luminance gradient change ratio in the search line direction on a reference edge (a two-dimensional edge whose reliability is to be calculated). Then, a reliability $r_i$ of each two-dimensional edge is calculated using a function given by:

$$r_i = \frac{grad - grad_{min}}{grad_{max} - grad_{min}} \quad (0 \leq r_i \leq 1) \quad (14)$$

Note that this embodiment will explain a case in which the reliability of each two-dimensional edge is calculated based on a luminance gradient. However, the calculation method of the reliability of the two-dimensional edge is not limited to this. In a region of an image where two-dimensional edges are closed up, a plurality of two-dimensional edges are readily erroneously detected. For this reason, by using this property, a reliability may be calculated according to the density of two-dimensional edges near a control point on the reference edge. For example, a function which assigns a higher reliability to a two-dimensional edge when a given region having the control point on the reference edge as the center includes a smaller number of control points may be used. In addition, a distance between the control point on the reference edge and a closest control point may be calculated, and a higher reliability may be assigned to a two-dimensional edge having the larger distance. After the calculations of the reliabilities, the respective two-dimensional edges hold the reliabilities calculated by the aforementioned processing.

[S403 to S407]

The three-dimensional measurement apparatus 100 controls the reliability calculation unit 140 to associate the two-dimensional edges detected in step S402 to the three-dimensional edges of the three-dimensional geometric model as in the first embodiment (S103).

The reliability calculation unit 140 repetitively executes the processes in steps S401 to S406 to count the number of times when an edge (three-dimensional projected edge) detected from each view-point image is associated with each edge (three-dimensional edge) of the three-dimensional geometric model. At this time, the reliability calculation unit 140 adds the reliability of the associated two-dimensional edge (three-dimensional projected edge) to the corresponding edge (three-dimensional edge) of the three-dimensional geometric model. This count value and the reliability value are held in the edge list data.

Edge list data will be described below with reference to FIG. 12. This list holds information associated with edges (three-dimensional edges) which configure the three-dimensional geometric model.

The edge list data holds information including a control point number used to identify each three-dimensional edge, three-dimensional coordinates of a control point, a three-dimensional vector indicating the direction of the edge, and a count value indicating the number of times when that three-dimensional edge is observed in different view-point images.

Also, the edge list data according to the second embodiment also holds a sum total of view-point-dependent reliabilities. The sum total of view-point-dependent reliabilities indicates that of reliabilities of two-dimensional edges associated with the corresponding three-dimensional edge. That is, every time a two-dimensional edge is associated, the reliability of that two-dimensional edge (the reliability calculated using equation (14)) is added to the corresponding three-dimensional edge.

[S408]

The three-dimensional measurement apparatus 100 controls the reliability calculation unit 140 to average the sum total of view-point-dependent reliabilities by dividing it by the corresponding count value for each edge in the edge list data shown in FIG. 12. Thus, the reliabilities of the edges of the three-dimensional geometric model are calculated. Note that position/orientation calculation processing is executed by changing degrees of contribution of respective edges to the position/orientation calculation processing by weighting the edges of the three-dimensional geometric model according to the reliabilities of those edges as in the first embodiment.

As described above, according to the second embodiment, the reliability-assigned model which additionally considers the reliabilities of the edges detected from the respective view-point images is generated. In this way, the precision of the edges detected from respective view-points can be reflected to the reliability of each edge of the reliability-assigned model.

Third Embodiment

The third embodiment will be described below. In the third embodiment, upon generation of a reliability-assigned model, reliabilities of edges in view-point images are calculated. Then, the edges of the view-point images are associated with those of a three-dimensional geometric model. As a result, the edges of the reliability-assigned model have reliabilities according to a plurality of view-point images. That is, the three-dimensional geometric model according to the third embodiment has view-point-dependent reliabilities of respective edges.

Note that the functional arrangement of a three-dimensional measurement apparatus 100 according to the third embodiment is the same as that shown in FIG. 1 used to explain the first embodiment, and a detailed description thereof will not be repeated.

As a difference in terms of the arrangement, a reliability calculation unit 140 includes an edge reliability calculation function and view-point-dependent reliability assigning function in addition to the aforementioned functions. The edge reliability calculation function is a function of calculating view-point-dependent reliabilities of edges detected from a plurality of view-point images (second edges). More specifically, a reliability of an edge (second edge) detected from each view-point image is independently calculated in correspondence with the view-point image as a detection source of that edge.

The view-point-dependent reliability assigning function is a function of assigning, when edges detected from view-point images (three-dimensional projected edges) are associated with edges of three-dimensional geometric model (three-dimensional edges), view-point-dependent reliabilities of the three-dimensional projected edges to the three-dimensional edges. Since the view-point-dependent reliabilities of the three-dimensional projected edges are assigned to the three-dimensional edges, view-point-dependent reliabilities are finally assigned to each three-dimensional edge.

Processing different from the first embodiment will be described below. The different processing includes reliability-assigned model generation processing and position/orientation calculation processing.

Figure 13:
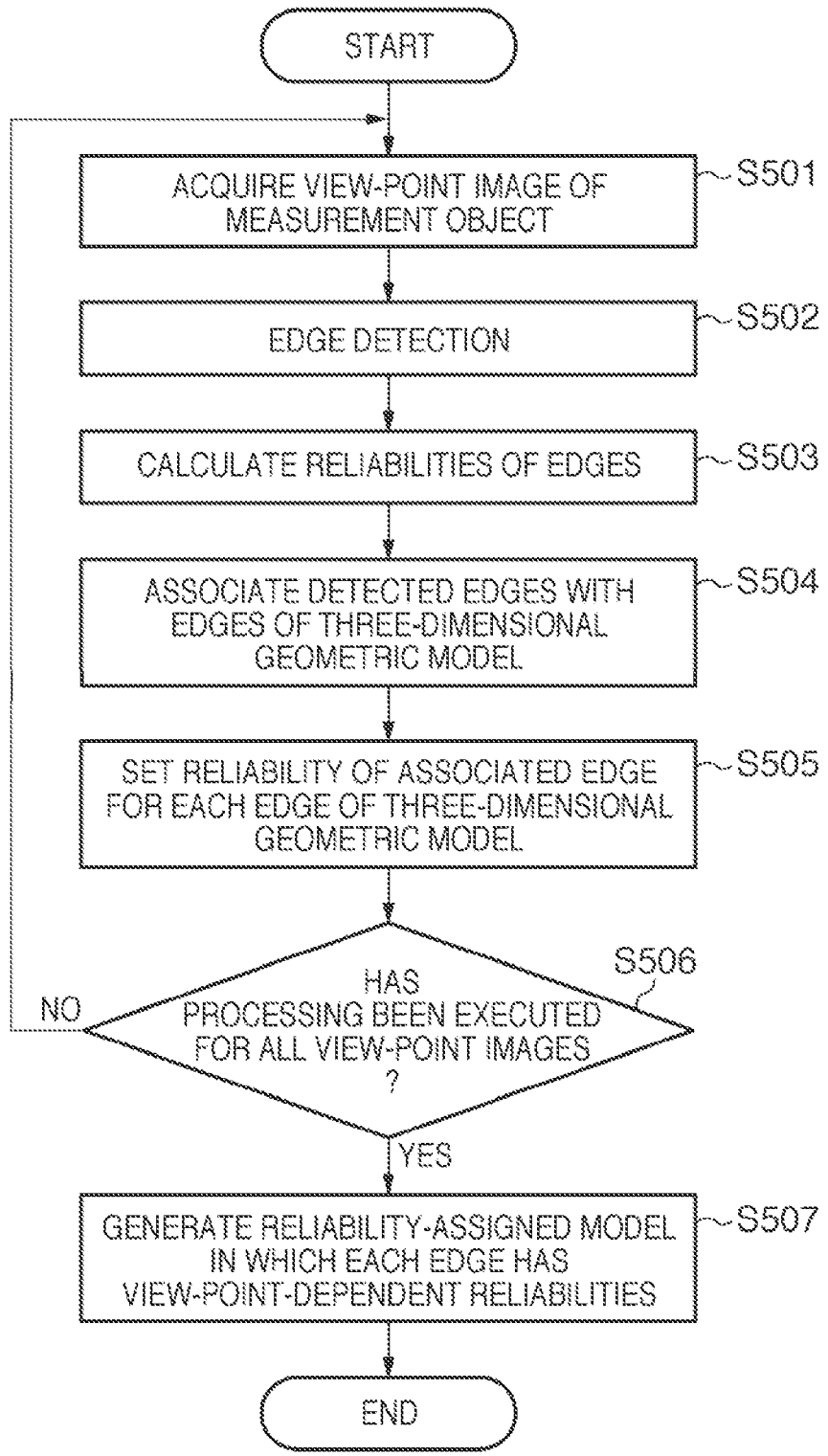
FIG. 13 is a flowchart showing an example of the sequence of processing in a three-dimensional measurement apparatus 100 according to the third embodiment.

An example of the sequence of the reliability-assigned model generation processing according to the third embodiment will be described below with reference to FIG. 13. Note that the processes in steps S501 to S504 are the same as those in steps S401 to S404 in FIG. 11 used to explain the second embodiment, and processes in step S505 and subsequent steps will be described.

[S505 to S507]

Reliabilities of two-dimensional edges are calculated by the process in step S503, and the two-dimensional edges detected in step S502 are assigned with the three-dimensional edges of the three-dimensional geometric model in the process in step S504. In step S505, the three-dimensional measurement apparatus 100 controls the reliability calculation unit 140 to assign the reliabilities held by the two-dimensional edges to the three-dimensional edges associated with the two-dimensional edges. If view-point images to be processed still remain in step S506, the process returns to step S501 to apply the same processes to the next view-point image. With the processes in steps S501 to S506, different view-point-dependent reliabilities are assigned to each three-dimensional edge.

In this way, a view-point-dependent reliability-assigned model is generated in step S507. That is, a reliability-assigned model in which each of the edges of the three-dimensional geometric model has a plurality of view-point-dependent reliabilities is generated.

An example of the view-point-dependent reliability-assigned model generated by the process in step S507 will be described below with reference to FIG. 14.

The reliability-assigned model holds information including a control point number used to identify each three-dimensional edge, three-dimensional coordinates of a control point, a three-dimensional vector indicating the direction of that edge, and reliabilities at respective view-points. The reliabilities at respective view-points are assured for view-points 0 to 60. In this case, reliabilities are calculated for 61 view-point images. Note that a view-point number which can identify a camera view-point at the time of generation of each view-point image is assigned to that camera view-point.

Processing upon calculating the position and orientation of an object will be briefly described below. In the third embodiment, reliabilities of a view-point closest to that of an image captured by an imaging unit 160 are acquired from the view-point-dependent reliability-assigned model. This acquisition is made based on approximate values of the position and orientation of a measurement object. More specifically, a view-point having a minimum angle made by its view-point vector and that based on the approximate values is selected from those used to generate view-point images. After that, using the reliabilities at the selected view-point, the edges of the three-dimensional geometric model are weighted according to the reliabilities of those edges, thereby changing the degrees of contribution of the edges to the position/orientation calculation processing.

As described above, according to the third embodiment, the view-point-dependent reliability-assigned model having reliabilities in correspondence with respective view-points is generated. With this model, since the view-point-dependent reliabilities of the edges can be reflected to the degrees of contribution of the respective edges to the position/orientation calculation processing, the position and orientation of the object can be measured more precisely.

Modification-1 of Third Embodiment

In the aforementioned third embodiment, by selecting a view-point having a minimum angle made by its view-point vector and that based on the approximate values from those used to generate view-point images, reliabilities are selected from those held for respective view-points. However, the present invention is not limited to this.

For example, three view-points having first, second, and third smallest angles made by their line-of-sight vectors and that based on the approximate values may be selected from those used to generate view-point images, and reliabilities may be calculated by averaging those of the three view-points for respective edges. In addition, for example, reliabilities may be calculated by weighting them based on distances between the selected three view-points and their barycenters.

Modification-2 of Third Embodiment

In the aforementioned third embodiment, control point numbers are assigned to control points of the three-dimensional edges, and the two-dimensional edges and three-dimensional edges are associated with each other by searching which three-dimensional edges two-dimensional edges correspond to. However, the edges may be associated with each other by other methods. For example, detection numbers may be assigned to the two-dimensional edges detected from respective view-point images, and the three-dimensional edges may be associated with these two-dimensional edges. Then, the reliabilities of the two-dimensional edges are assigned to the three-dimensional edges associated with the two-dimensional edges.

FIG. 15 shows an example of edge list data which holds respective two-dimensional edges in case of such configuration. This edge list data is generated for each view-point.

The edge list data holds information including a detection number, control point coordinates, an edge direction vector, and a reliability. This view-point-dependent edge list data is calculated for all the view-points. Since the numbers of edges to be detected are different for respective view-points, the numbers of edges in the edge list data are different for respective view-points.

The representative embodiments of the present invention have been exemplified. However, the present invention is not limited to the aforementioned and illustrated embodiments, and allows modifications as needed without departing from the scope of its gist.

For example, in the aforementioned first to third embodiments, the model generation processing and position/orientation calculation processing are executed by a single apparatus. However, the present invention is not limited to this. For example, the model generation processing may be executed by a first apparatus (model generation apparatus), and the position/orientation calculation processing may be executed by a second apparatus (three-dimensional measurement apparatus).

Note that the present invention can adopt embodiments in the form of, for example, a system, apparatus, method, program, or storage medium. More specifically, the present invention may be applied to either a system configured by a plurality of devices or an apparatus including a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, non-transitory computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043060 filed on Feb. 26, 2010, which is hereby incorporated by reference herein in its entirety.

The invention claimed is:

1. A three-dimensional measurement apparatus, which measures a position and an orientation of a measurement object using a three-dimensional geometric model that defines a shape of the measurement object using a plurality of first edges, said apparatus comprising:
    an edge detection unit configured to detect, as second edges, edges corresponding to the plurality of first edges from the plurality of view-point images obtained by rendering the three-dimensional geometric model of a measurement object at a plurality of different view-points;
    a counting unit configured to count a number of times the second edges are detected from the plurality of view-point images;
    a reliability assigning unit configured to assign reliabilities of the plurality of first edges based on the number of times the second edges are detected from the plurality of view-point images;
    an association unit configured to associate third edges detected from a captured image with the first edges; and
    a position/orientation calculation unit configured to calculate a position and an orientation of the measurement object based on the association result and the assigned reliabilities of the first edges.

2. The apparatus according to claim 1, wherein
    said counting unit counts a number of times the second edges are associated with each of the first edges to obtain a count value;
    said reliability assigning unit calculates a sum total of reliabilities of second edges associated with the first edges for each first edge; and
    said reliability assigning unit assigns a reliability of each of the first edges by dividing the calculated sum total of the reliabilities by the count value.

3. The apparatus according to claim 2, the reliabilities are further based on a luminance gradient of the second edge.

4. The apparatus according to claim 1, further comprising:
    a weighting unit configured to weight associations between the first edges and the second edges based on the assigned reliabilities.

5. The apparatus according to claim 1, wherein said reliability assigning unit assigns reliabilities such that as the number of times the second edges are detected from the plurality of view-point images increases, a reliability assigned increases.

6. The apparatus according to claim 1, further comprising:
    an acquisition unit configured to acquire approximate values indicating an approximate position and orientation of the measurement object,
    wherein the third edges are detected from the captured image based on the approximate values.

7. An apparatus comprising:
    a feature detection unit configured to detect a plurality of features of a measurement object from the plurality of view-point images obtained by rendering the measurement object from a plurality of different view-points using a three-dimensional geometric model;
    a counting unit configured to count a number of times each detected feature is detected from the plurality of view-point images;
    a reliability setting unit configured to set, based on the number of times each detected feature is detected from the plurality of view-point images, reliabilities of each model feature corresponding to each detected feature;

a reliability obtaining unit configured to associate the detected features of the measurement object with model features of the three-dimensional geometric model, and obtain reliabilities of the model features of the three-dimensional geometric model based on the association result and the set reliabilities of the features of the measurement object; and a generation unit configured to generate a reliability-assigned model by assigning the reliabilities of the model features to the model features of the three-dimensional geometric model.

8. A three-dimensional measurement apparatus, which measures a position and an orientation of a measurement object, said apparatus comprising:

a holding unit configured to hold a reliability-assigned model, wherein in the reliability-assigned model, reliabilities are assigned to model features constituting the reliability-assigned model, wherein a number of times model features are observed from images obtained by rendering the reliability-assigned model of the measurement object at the plurality of different view-points is counted and as the counted number of times the model features are observed increases, the assigned reliability increases;

a detection unit configured to detect features from a captured image obtained by capturing an image of the measurement object;

an association unit configured to associate the detected features with the model features of the three-dimensional geometric model; and a position/orientation calculation unit configured to calculate a position and an orientation of the measurement object based on the association result and the assigned reliabilities of the model features.

9. A processing method of a three-dimensional measurement apparatus including at least a processor and a memory, which measures a position and an orientation of a measurement object using a three-dimensional geometric model that defines a shape of the measurement object using a plurality of first edges, the method comprising:

a step of detecting, with the processor, as second edges, edges corresponding to the plurality of first edges from the plurality of view-point images obtained by rendering the three-dimensional geometric model of a measurement object at a plurality of different view-points;

a step of counting a number of times the second edges are detected from the plurality of view-point images;

a step of assigning, with the processor, reliabilities of the plurality of first edges based on the number of times the second edges are detected from the plurality of view-point images;

a step of associating third edges detected from a captured image with the first edges; and a step of calculating, with the processor, a position and an orientation of the measurement object based on the association result and the assigned reliabilities of the first edges.

10. A non-transitory computer-readable storage medium storing a computer program for controlling a computer incorporated in a three-dimensional measurement apparatus, which measures a position and an orientation of a measurement object using a three-dimensional geometric model that defines a shape of the measurement object using a plurality of first edges, to function as:

an edge detection unit configured to detect, as second edges, edges corresponding to the plurality of first edges from the plurality of view-point images obtained by rendering the three-dimensional geometric model of a measurement object at a plurality of different view-points;

a counting unit configured to count a number of times the second edges are detected from the plurality of view-point images;

a reliability assigning unit configured to assign reliabilities of the plurality of first edges based on the number of times the second edges are detected from the plurality of view-point images;

an association unit configured to associate third edges detected from a captured image with the first edges; and a position/orientation calculation unit configured to calculate a position and an orientation of the measurement object based on the association result and the assigned reliabilities of the first edges.

11. The apparatus according to claim 7, wherein the feature is at least one of an edge and point.

12. The apparatus according to claim 7, wherein
said counting unit counts the number of times the second edges are associated with each of the first edges to obtain a count value;
said reliability obtaining unit calculates a sum total of reliabilities of second edges associated with the first edges for each first edge; and
said reliability obtaining unit obtains a reliability of each of the first edges by dividing the calculated sum total of the reliabilities by the count value.

13. The apparatus according to claim 7, said reliability obtaining unit obtains a reliability based on further a luminance gradient on the second edge.

14. A processing method of an apparatus including at least a processor and a memory, the method comprising:

a step of detecting, with the processor, a plurality of features of a measurement object from the plurality of view-point images obtained by rendering the measurement object from a plurality of different view-points using a three-dimensional geometric model;

a step of counting a number of times each detected feature is detected from the plurality of view-point images;

a step of setting, based on the number of times each detected feature is detected from the plurality of view-point images, reliabilities of each model feature corresponding to each detected feature;

a step of associating, with the processor, the detected features of the measurement object with model features of the three-dimensional geometric model, and obtaining reliabilities of the model features of the three-dimensional geometric model based on the association result and the set reliabilities of the features of the measurement object; and a step of generating, with the processor, a reliability-assigned model by assigning the reliabilities of the model features to the model features of the three-dimensional geometric model.

15. A non-transitory computer-readable storage medium storing a computer program for controlling a computer incorporated in an apparatus to function as:

a feature an edge detection unit configured to detect a plurality of features of a measurement object from the plurality of view-point images obtained by rendering the measurement object from a plurality of different view-points using a three-dimensional geometric model;

a counting unit configured to count a number of times each detected feature is detected from the plurality of view-point images;

a reliability setting unit configured to set, based on the number of times each detected feature is detected from the plurality of view-point images, reliabilities of each model feature corresponding to each detected feature;

a reliability obtaining unit configured to associate the detected features of the measurement object with model features of the three-dimensional geometric model, and obtain reliabilities of the model features of the three-dimensional geometric model based on the association result and the set reliabilities of the features of the measurement object; and a generation unit configured to generate a reliability-assigned model by assigning the reliabilities of the model features to the model features of the three-dimensional geometric model.

16. A three-dimensional measurement apparatus, which measures a position and an orientation of a measurement object using a three-dimensional geometric model that defines a shape of the measurement object using a plurality of first edges, said apparatus comprising:

an edge detection unit configured to detect, as second edges, edges of the measurement object from the plurality of view-point images obtained by observing the measurement object from a plurality of different view-points using the three-dimensional geometric model;

an associating unit configured to associate the second edges with the first edges;

a counting unit configured to count a number of times for each first edge when the second edges are associated with each of the first edges;

a reliability setting unit configured to set first reliabilities for the first edges based on the association result and the count value of the counting unit;

a weighting unit configured to weight each of the first edges based on the first reliabilities for the first edges set by said reliability setting unit; and a position/orientation calculation unit configured to associate third edges detected from a captured image obtained by capturing an image of the measurement object with the first edges weighted by said weighting unit, and calculate a position and an orientation of the measurement object based on the association result.

17. An apparatus comprising:

a feature detection unit configured to detect a plurality of features of a measurement object from the plurality of view-point images obtained by observing the measurement object from a plurality of different view-points using the three-dimensional geometric model;

an association unit configured to associate the detected features of the measurement object with model features of the three-dimensional geometric model;

a counting unit configured to count a number of times for each model feature when the model features are associated with the detected features;

a reliability setting unit configured to set reliabilities for the model features of the three-dimensional geometric model based on the association result and the count value of the counting unit; and a generation unit configured to generate a reliability-assigned model by assigning the reliabilities for the model features to the model features of the three-dimensional geometric model.

18. A three-dimensional measurement method, which measures a position and an orientation of a measurement object using a three-dimensional geometric model that defines a shape of the measurement object using a plurality of first edges, said method comprising:

an edge detection step of detecting, as second edges, edges of the measurement object from the plurality of view-point images obtained by observing the measurement object from a plurality of different view-points using the three-dimensional geometric model;

an associating step of associating the second edges with the first edges;

a counting step of counting a number of times for each first edge when the second edges are associated with each of the first edges;

a reliability setting step of setting first reliabilities for the first edges based on the association result and the count value of the counting step;

a weighting step of weighting each of the first edges based on the first reliabilities for the first edges set by said reliability setting step; and a position/orientation calculation step of associating third edges detected from a captured image obtained by capturing an image of the measurement object with the first edges weighted by said weighting step, and calculate a position and an orientation of the measurement object based on the association result.

19. A method comprising:

a feature detection step of detecting a plurality of features of a measurement object from the plurality of view-point images obtained by observing the measurement object from a plurality of different view-points using the three-dimensional geometric model;

an association step of associating the detected features of the measurement object with model features of the three-dimensional geometric model;

a counting step of counting a number of times for each model feature when the model features are associated with the detected features;

a reliability setting step of setting reliabilities for the model features of the three-dimensional geometric model based on the association result and the count value of the counting step; and a generation step of generating a reliability-assigned model by assigning the reliabilities for the model features to the model features of the three-dimensional geometric model.

20. A non-transitory computer-readable storage medium storing a computer program for controlling a computer incorporated in a three-dimensional measurement apparatus, which measures a position and an orientation of a measurement object using a three-dimensional geometric model that defines a shape of the measurement object using a plurality of first edges, to function as:

an edge detection unit configured to detect, as second edges, edges of the measurement object from the plurality of view-point images obtained by observing the measurement object from a plurality of different view-points using the three-dimensional geometric model;

an associating unit configured to associate the second edges with the first edges;

a counting unit configured to count a number of times for each first edge when the second edges are associated with each of the first edges;

a reliability setting unit configured to set first reliabilities for the first edges based on the association result and the count value of the counting unit;

a weighting unit configured to weight each of the first edges based on the first reliabilities for the first edges set by said reliability setting unit; and a position/orientation calculation unit configured to associate third edges detected from a captured image obtained by capturing an image of the measurement object with the first edges weighted by said weighting unit, and calculate a position and an orientation of the measurement object based on the association result.

21. A non-transitory computer-readable storage medium storing a computer program for controlling a computer incorporated in an apparatus, to function as:

a feature detection unit configured to detect a plurality of features of a measurement object from the plurality of view-point images obtained by observing the measurement object from a plurality of different view-points using the three-dimensional geometric model;

an association unit configured to associate the detected features of the measurement object with model features of the three-dimensional geometric model;

a counting unit configured to count a number of times for each model feature when the model features are associated with the detected features;

a reliability setting unit configured to set reliabilities for the model features of the three-dimensional geometric model based on the association result and the count value of the counting unit; and a generation unit configured to generate a reliability-assigned model by assigning the reliabilities for the model features to the model features of the three-dimensional geometric model.

22. The apparatus according to claim 8, further comprising a weighting unit configured to weight associations between the detected features and the model features.

23. A processing method of an apparatus including at least a processor and a memory, the method comprising:

holding a reliability-assigned model in the memory, wherein in the reliability-assigned model, reliabilities are assigned to model features constituting the reliability-assigned model, wherein a number of times when model features are observed from images obtained by rendering the reliability-assigned model of the measurement object at the plurality of different view-points is counted and as the counted number of times the model features are observed increases, a reliability assigned to the model feature increases;

detecting features from a captured image obtained by capturing an image of the measurement object;

associating the detected features with the model features of the three-dimensional geometric model; and calculating a position and an orientation of the measurement object based on the association result and the assigned reliabilities of the model features.

24. A non-transitory computer-readable storage medium storing a computer program for controlling a computer incorporated in an apparatus, to function as:

a holding unit configured to hold a reliability-assigned model, wherein in the reliability-assigned model, reliabilities are assigned to model features constituting the reliability-assigned model, wherein a number of times when model features are observed from images obtained by rendering the reliability-assigned model of the measurement object at the plurality of different view-points is counted and as the counted number of times the model features are observed increases, a reliability assigned to the model feature increases;

a detection unit configured to detect features from a captured image obtained by capturing an image of the measurement object;

an association unit configured to associate the detected features with the model features of the three-dimensional geometric model; and a position/orientation calculation unit configured to calculate a position and an orientation of the measurement object based on the association result and the assigned reliabilities of the model features.

* * * * *